United States Patent
Lyons et al.

(10) Patent No.: US 8,074,869 B2
(45) Date of Patent: Dec. 13, 2011

(54) SYSTEM, METHOD, AND APPARATUS FOR REACTIVE FOIL BRAZING OF CUTTER COMPONENTS FOR FIXED CUTTER BIT

(75) Inventors: Nicholas J. Lyons, Houston, TX (US); Nathan David Ames, Sunbury, OH (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 11/939,692

(22) Filed: Nov. 14, 2007

(65) Prior Publication Data

US 2009/0078470 A1  Mar. 26, 2009

Related U.S. Application Data

(60) Provisional application No. 60/994,983, filed on Sep. 24, 2007.

(51) Int. Cl.
B23K 31/02 (2006.01)
(52) U.S. Cl. ............... 228/234.3; 228/124.5; 228/198; 228/107; 228/2.5; 175/375; 76/108.1; 76/108.2; 76/108.4
(58) Field of Classification Search .............. 175/375, 175/435; 76/108.1–108.4; 228/124.5, 198, 228/234.3, 2.5, 107
See application file for complete search history.

(56) References Cited

U.S. PATENT DOCUMENTS

| | | | |
|---|---|---|---|
| 4,156,329 A | 5/1979 | Daniels et al. | |
| 4,225,322 A | 9/1980 | Knemeyer | |
| 4,247,305 A | 1/1981 | Daniels et al. | |
| 4,258,807 A | 3/1981 | Fischer et al. | |
| 4,319,707 A | 3/1982 | Knemeyer | |
| 4,527,998 A | 7/1985 | Knemeyer | |
| 4,690,691 A | 9/1987 | Komanduri | |
| 4,767,050 A | 8/1988 | Flood et al. | |
| 4,772,294 A | 9/1988 | Schroeder | |
| 4,850,523 A | 7/1989 | Slutz | |
| 4,899,922 A | 2/1990 | Slutz et al. | |
| 4,931,363 A | 6/1990 | Slutz et al. | |
| 5,533,582 A | 7/1996 | Tibbitts | |
| 2002/0092684 A1 | 7/2002 | Singh et al. | |
| 2002/0162691 A1 | 11/2002 | Fang et al. | |
| 2003/0164289 A1 | 9/2003 | Weihs et al. | |
| 2004/0149373 A1 | 8/2004 | Weihs et al. | |
| 2004/0151939 A1* | 8/2004 | Weihs et al. | 428/606 |

(Continued)

FOREIGN PATENT DOCUMENTS

WO  0034001  6/2000

OTHER PUBLICATIONS

Random House Dictionary, Dictionary.com "Pulse".*

(Continued)

Primary Examiner — Kiley Stoner
Assistant Examiner — Erin Saad
(74) Attorney, Agent, or Firm — TraskBritt

(57) ABSTRACT

A reactive foil is used to assemble the components of rock bit cutters and to affix cutting elements to rock bit bodies. A small pulse of localized energy ignites the foil in a fraction of a second to deliver the necessary amount of heat energy to flow solder or braze and form a strong, true metallic joint. The reaction in the foil may be activated using optical, electrical, or thermal sources.

19 Claims, 4 Drawing Sheets

U.S. PATENT DOCUMENTS

| | | |
|---|---|---|
| 2004/0247931 A1 | 12/2004 | Weihs et al. |
| 2005/0003228 A1 | 1/2005 | Weihs et al. |
| 2005/0051607 A1* | 3/2005 | Wang et al. .................. 228/246 |
| 2005/0082343 A1* | 4/2005 | Wang et al. .................. 228/115 |
| 2005/0136270 A1 | 6/2005 | Besnoin et al. |
| 2006/0150777 A1* | 7/2006 | Sherwood et al. ........... 76/108.1 |
| 2006/0219759 A1 | 10/2006 | Duckham et al. |
| 2006/0254830 A1* | 11/2006 | Radtke ......................... 175/426 |

OTHER PUBLICATIONS

Pi Prince/Izant Co. "Encyclopedia of Brazing": Exothermic Brazing.*

* cited by examiner

US 8,074,869 B2

SYSTEM, METHOD, AND APPARATUS FOR REACTIVE FOIL BRAZING OF CUTTER COMPONENTS FOR FIXED CUTTER BIT

PRIORITY CLAIM

This application claims the benefit of U.S. Provisional Patent App. Ser. No. 60/994,983, filed Sep. 24, 2007.

BACKGROUND OF THE INVENTION

1. Technical Field

The present invention relates in general to fabricating earth boring bits and, in particular, to an improved system, method, and apparatus for brazing together the components of cutters for fixed cutter bits.

2. Description of the Related Art

Rotary drill bits are commonly used for drilling boreholes or wells in earth formations. One type of rotary drill bit is the fixed cutter bit or "drag bit," which typically includes a plurality of cutting elements secured to a face region of a bit body. Generally, the cutting elements of a fixed cutter type drill bit have either a disk shape or a substantially cylindrical shape. A hard, super abrasive material, such as mutually bonded particles of polycrystalline diamond, may be provided on a substantially circular end surface of each cutting element to provide a cutting surface. Such cutting elements are often referred to as "polycrystalline diamond compact" (PDC) cutters.

Typically, the cutting elements are fabricated separately from the bit body and secured within pockets formed in the outer surface of the bit body. A bonding material such as an adhesive or, more typically, a braze alloy may be used to secured the cutting elements to the bit body. The fixed cutter drill bit may be placed in a borehole such that the cutting elements are adjacent the earth formation to be drilled. As the drill bit is rotated, the cutting elements scrape across and shear away the surface of the underlying formation.

The bit body includes wings or blades, which are separated by junk slots. Internal fluid passageways extend between the face of the bit body and a longitudinal bore, which extends through the steel shank and partially through the bit body. A plurality of PDC cutters are provided on the face of the bit body. The PDC cutters may be provided along the blades within pockets formed in the face of the bit body.

The PDC cutters may be bonded to the bit body after the bit body has been cast by, for example, brazing, mechanical affixation, or adhesive affixation. Alternatively, the PDC cutters may be provided within a mold and bonded to the bit body during infiltration or furnacing of the bit body if thermally stable synthetic diamonds, or natural diamonds are employed. However, the high temperature ranges used to fabricate the bits can change the properties of the metals and other materials used. Thus, an improved system for joining the cutting elements to fixed cutter bits that overcomes the limitations of conventional processes would be desirable.

SUMMARY OF THE INVENTION

Embodiments of a system, method, and apparatus for assembling rock bit compacts with a reactive exothermic foil are disclosed. A small pulse of localized energy ignites the foil in a fraction of a second to deliver the necessary amount of heat energy to flow solder or braze (e.g., Ag—Cu) and form a strong, true metallurgical joint. The reaction in the foil may be activated using optical, electrical, or thermal sources.

An effective bond may be formed between the substrate or extension of a rock bit cutter and its cutting element (e.g., tungsten carbide tip) using these techniques. The invention eliminates the need for a standard furnace, torch, or laser weld. Bonds between similar or dissimilar materials (e.g., ceramics to metals) may be formed in almost any environment (e.g., in ambient conditions), and are resistant to corrosion and degradation. The bonds exert low stress on the constituent parts, expose them to minimal thermal demands, and can be produced in a flux free environment. In addition, the invention may be used to join cutting elements to the bit body.

The foregoing and other objects and advantages of the present invention will be apparent to those skilled in the art, in view of the following detailed description of the present invention, when taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings, which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Embodiments of a system, method and apparatus for reactively brazing together the components of rock bit cutters are disclosed. The invention utilizes technology disclosed in U.S. Patent Application Nos. 2004/0149373, published on Aug. 5, 2004; 2004/0247931, published on Dec. 9, 2004; 2005/0003228, published on Jan. 6, 2005; and 2006/0219759, published on Oct. 5, 2006, all of which are incorporated herein by reference.

Figure 1:
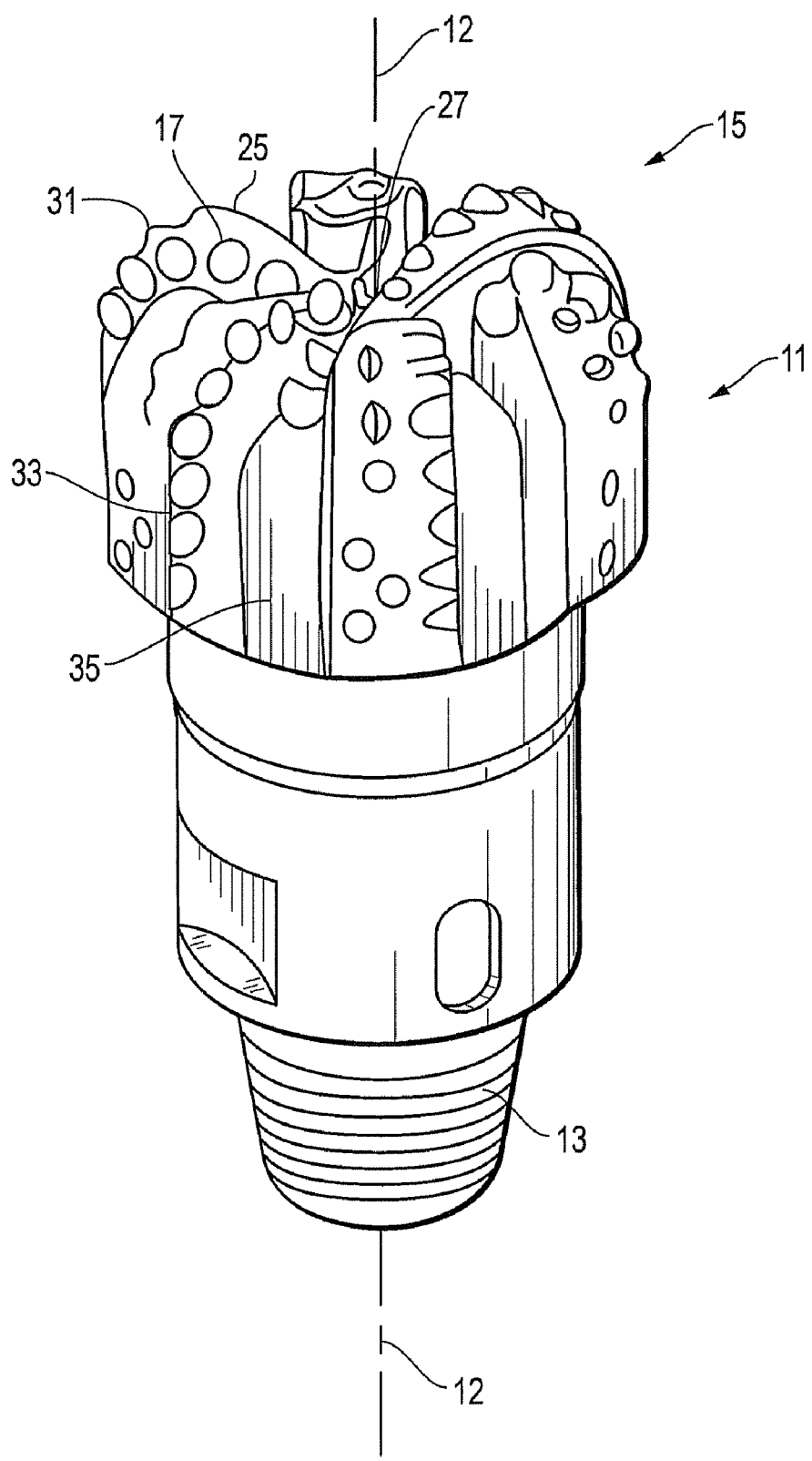
FIG. 1 is an isometric view of one embodiment of an earth boring bit constructed in accordance with the invention.

Referring to FIG. 1, one embodiment of a fixed cutter rotary drill bit 11 is shown. Bit 11 has a rotational axis 12 and a threaded end 13 for connection into a drill string. A cutting end 15 at a generally opposite end of the bit 11 is provided with a plurality of hard cutting elements 17 (e.g., polycrystalline diamond cutters, etc.) arranged about cutting end 15 to effect efficient removal or cutting of formation material as bit 11 is rotated in a borehole.

The cutting elements 17 typically are secured in pockets provided on cutting end 15 such that the cutting elements 17 engage formation material. As illustrated, cutting element 17 may comprise a frustoconical cutting element 21 (see FIG. 2) having a beveled edge. Cutting element 17 acts somewhat like a plow that generally directs a high percentage of the material of the formation up the flat face.

The arrangement of cutting elements 17 on bit 11 is configured in an overall cutting profile about bit axis 12. Starting at axis 12 and moving toward the outer diameter of bit 11, the profile includes a cone 27, a nose 25, a shoulder 31, and a gauge pad or surface 33. The gauge pad 33 essentially defines the flat, outer diameter portion of bit 11 that extends from cutting end 15 and is proximal to and contacts the sidewall of the borehole during drilling operation of bit 11. A plurality of channels or junk slots 35 extends from cutting end 15 through gauge pad 33 to provide a clearance area for the removal of cuttings and chips formed by cutting elements 17.

As suggested above, a plurality of cutting elements 17 are provided on gauge pad 33. Cutting elements 17 on gauge pad 33 provide the ability to actively cut formation material at the sidewall of the borehole to provide dynamic stability and improved gauge-holding ability in earth boring bits of the fixed cutter variety. The cutting elements 17 on gauge pad 33 may be ground flat at the outer diameter of bit 11 for some applications. Bit 11 is illustrated as a polycrystalline diamond cutter (PDC) bit, but cutting elements 17 are equally useful in other fixed cutter or drag bits that include a gauge surface for engagement with the sidewall of the borehole. Examples include impregnated and natural diamond bits.

Figure 2:
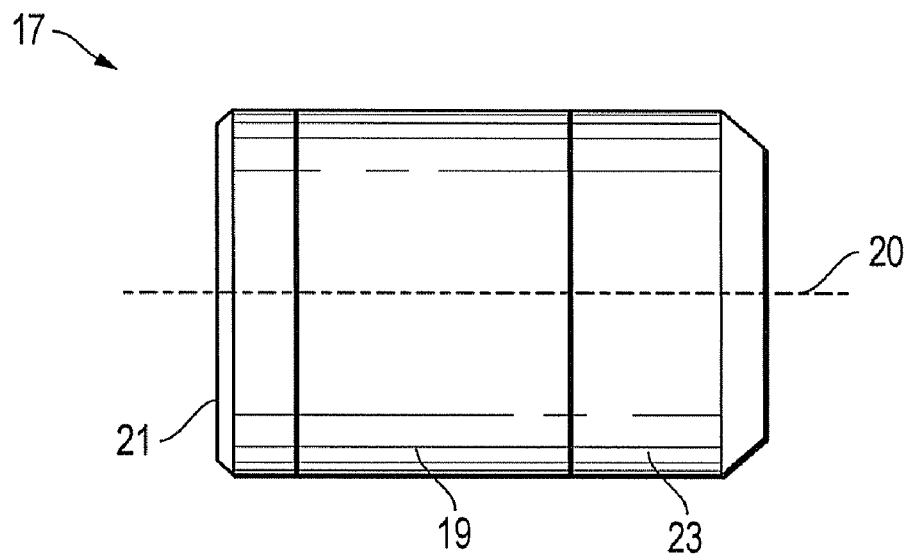
FIG. 2 is a side view of one embodiment of a cutting element constructed in accordance with the invention.
Figure 3:
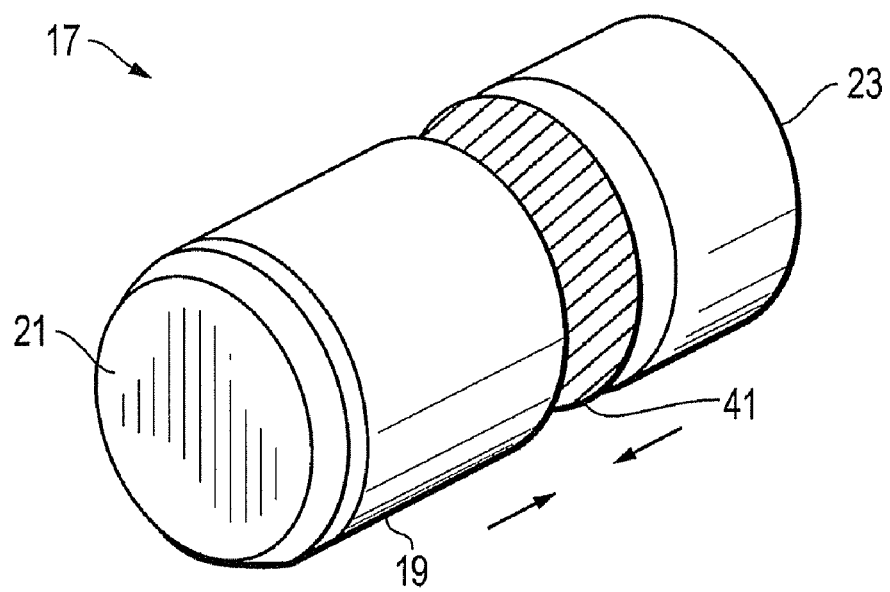
FIG. 3 is an exploded isometric view of one embodiment of a cutting element and is constructed in accordance with the invention.

As shown in FIGS. 2 and 3, each cutting element 17 has a cylindrical base 19 with an axis 20 and a PDC cutter 21 affixed thereto. The cutting element 17 also is provided with a substrate extension 23 that may be formed from the same material as base 19. The substrate extension 23 is secured to the base 19 opposite the PDC cutter 21.

A new set of materials and techniques may be used to braze and/or solder components of a cutting element and replace the conventional brazing processes that are typically employed. The components having desired physical properties (e.g., toughness, wear resistance, etc.), may be secured together with a reactive exothermic brazing technology. This technique eliminates: (1) the need for conventional brazing; (2) inconsistencies in cutter placement during conventional brazing; (3) brazing defects such as porosity; and (4) heat-affected zones and undesired phase changes due to traditional brazing processes. In addition, this technique allows experimentation and development of cutters that utilize virtually unlimited material selection to obtain unsurpassed bit life.

The various cutter components may be formed to design requirements and reactively brazed together. This technique is much more precise (e.g., within tolerances of approximately 0.010 inch) than conventional torch brazing techniques (e.g., within tolerances of approximately 0.030 inch) and does not degrade the parent material to produce a higher performing rock bit.

In one embodiment (FIG. 3), the base 19 and substrate extension 23 are joined with a reactive foil 41 and braze alloy that is located between the components. Physical pressure (e.g., on the order of 700 psi) is applied to the parts and a small, localized energy pulse or other ignition source flows the metallic foil 41 in milliseconds to produce a strong metallic joint that results in a very strong, completed braze that is cool to the touch in less than one second. This process only heats the immediate surface of the materials being joined and does not degrade any heat treatment or change any properties of the parts. The braze and/or solder material may comprise, for example, Ag—Cu, Ni—Al, Al—Si, Zn—Al, etc. The reaction in the foil may be activated with a small pulse of localized energy that can be applied using optical, electrical, or thermal sources, such as electrical pulse, spark, hot filament, laser beam, etc. Such techniques reduce processing time, eliminate brazing material and equipment, and provide a safer operation for personnel.

The reactive brazing process is quicker than conventional techniques and lends itself to high volume production since the cutters may be readily assembled with the reactive foil. Activation of the film is accomplished as described herein using a small pulse of localized energy that occurs in milliseconds. This technique only heats the surface of the elements without destroying the steel heat treatment of the adjacent material.

As described above, the feature and component may comprise many different elements of a bit. The flowable material may comprise an alloy material containing, for example, Ag, Cu, Al, Ni, Au, Zn, Sn, or Ti.

Figure 4A:
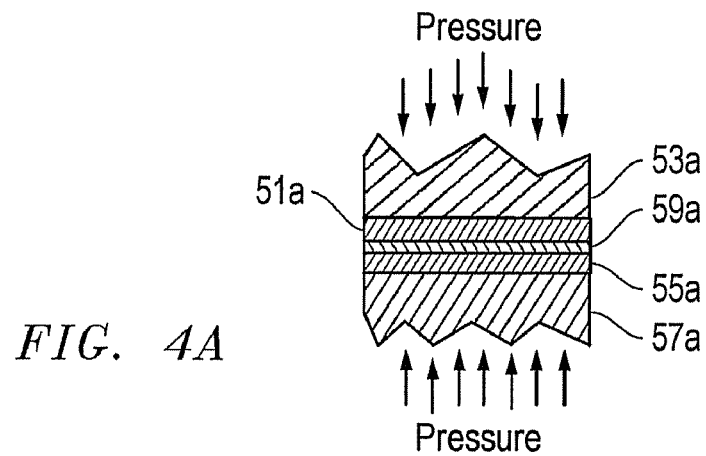
FIGS. 4A-4C are schematic sectional views of various embodiments of joint and material configurations for drill bit cutter assembly techniques and are constructed in accordance with the invention.

Referring now to FIG. 4A, the flowable material may comprise a first braze alloy foil 51a located adjacent to a first component 53a (e.g., base 19), a second braze alloy foil 55a located adjacent to a second component 57a (e.g., substrate extension 23), and the reactive material 59a (e.g., reactive foil) may be located between the first and second braze alloy foils 51a, 55a.

Figure 4B:
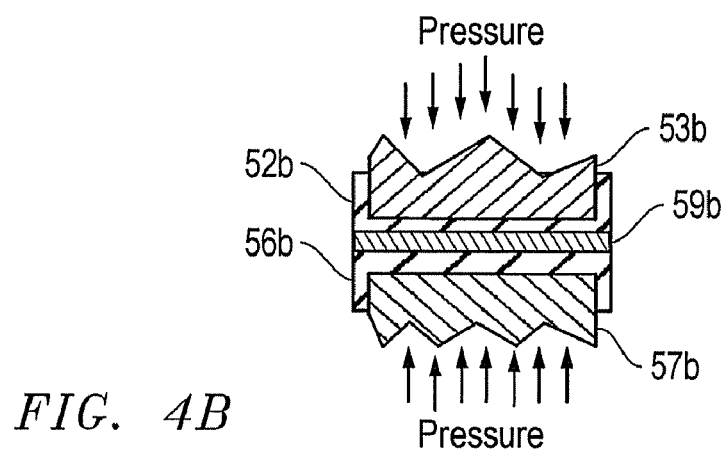

Alternatively (FIG. 4B), the first and second components 53b, 57b may be coated with a braze or solder alloy material 52b, 56b, respectively, before assembly with reactive material 59b.

Figure 4C:
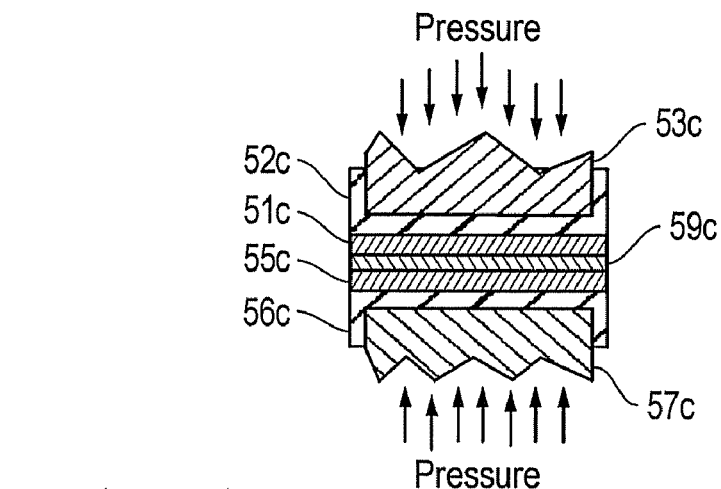

In another alternate embodiment (FIG. 4C), separate braze alloy foils 51c, 55c, may be positioned adjacent the respective coatings 52c, 56c on components 53c, 57c prior to assembly with reactive material 59c. Alternatively, two or more layers of reactive material and braze alloy foils may be used in combination. The different coatings may comprise the same materials or different materials depending on the application. Similarly, the coatings and braze alloy foils may comprise the same or different materials. The method may further comprise preheating the component and the feature and applying a compressive load between the rock bit body and the component before assembly.

Figure 5:
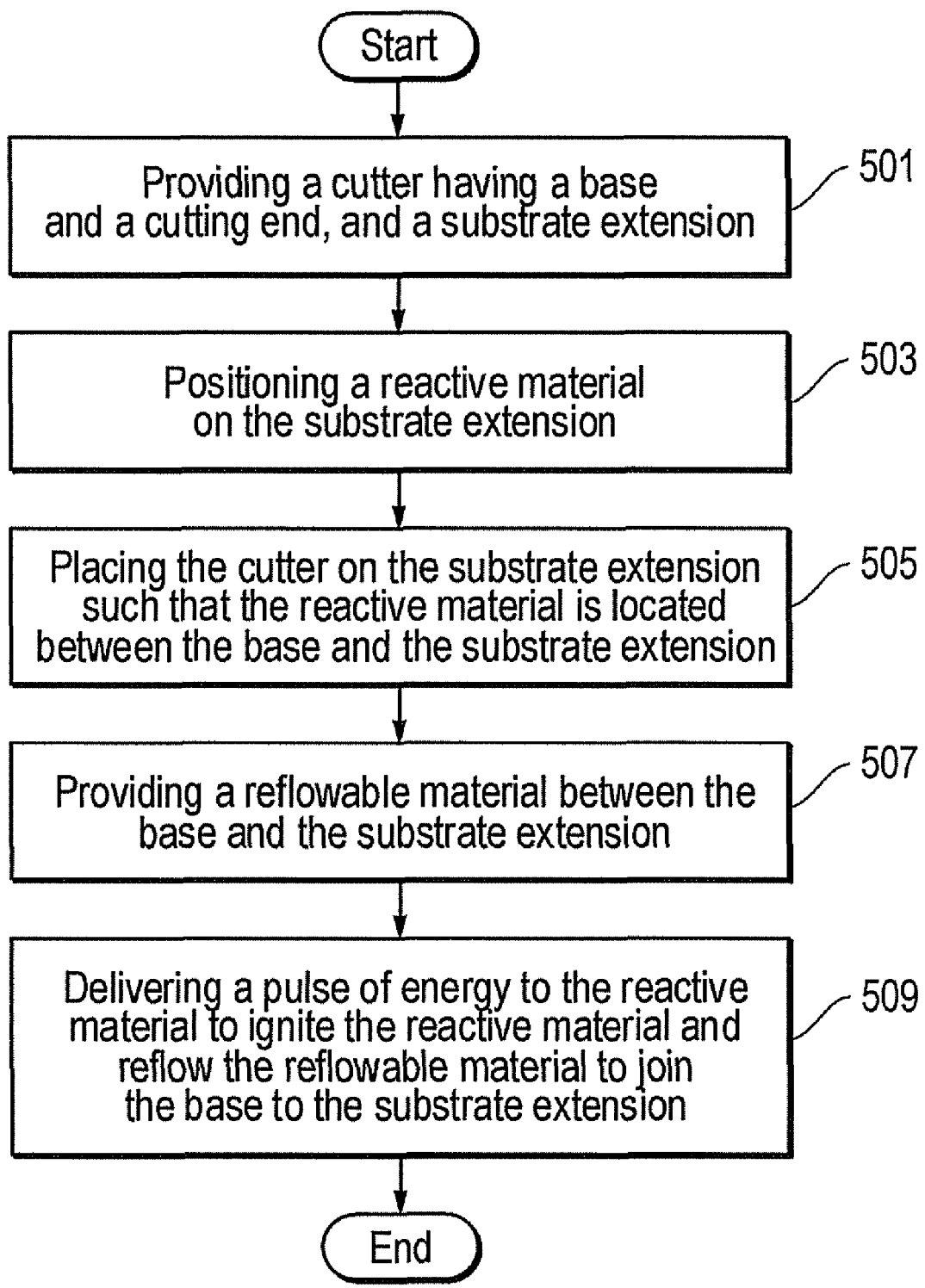
FIG. 5 is a high-level flow diagram of one embodiment of a method in accordance with the invention.

Referring now to FIG. 5, one embodiment of the invention includes a method of joining cutting components of a rock bit. The method begins as indicated, and comprises providing a cutter having a base and a cutting end, and a substrate extension (step 501); positioning a reactive material on the substrate extension (step 503); placing the cutter on the substrate extension such that the reactive material is located between the base and the substrate extension (step 505); providing a flowable material between the base and the substrate extension (step 507); delivering a pulse of energy to the reactive material to ignite the reactive material and flow the flowable material to join the base to the substrate extension (step 509); before ending as indicated. Other embodiments of the methods may utilize steps and techniques as described herein.

For example, one alternative embodiment of the method joins a cutter to a fixed cutter bit by providing a rock bit body having a fixed blade with a pocket formed therein; positioning a reactive foil in the pocket; placing a cutter in the pocket such that the reactive foil is located between the fixed blade and the cutter; providing a reflowable alloy between the fixed blade and the cutter; and delivering a pulse of energy to the reactive foil to ignite the reactive foil and reflow the reflowable alloy to join the cutter to the fixed blade in less than one second.

While the invention has been shown or described in only some of its forms, it should be apparent to those skilled in the art that it is not so limited, but is susceptible to various changes without departing from the scope of the invention.

What is claimed is:

1. A method of joining components of a drill bit cutting element for drilling boreholes in earth formations, comprising:
   providing a polycrystalline diamond compact (PDC) cutting element and a separate substrate extension;
   selecting the PDC cutting element to comprise a base and a PDC cutter attached to a first end of the base;
   positioning an exothermic reactive material and a braze alloy layer between an opposite second end of the base of the PDC cutting element and the substrate extension;
   applying pressure to force the base of the PDC cutting element and the substrate extension toward each other while the exothermic reactive material and the braze alloy layer are positioned between the base of the PDC cutting element and the substrate extension; and
   delivering a pulse of energy to the reactive material, igniting the reactive material, and causing the braze alloy layer to melt to join the base of the PDC cutting element to the substrate extension.

2. The method according to claim 1, wherein delivering the pulse of energy to the reactive material, igniting the reactive material, and causing the braze alloy layer to melt to join the base of the PDC cutting element to the substrate extension requires less than one second.

3. The method according to claim 1, further comprising selecting the braze alloy layer from the group consisting of Ag, Cu, Al, Ni, Au, Zn, Sn, and Ti.

4. The method according to claim 1, further comprising applying the pulse of energy with one of an optical energy source, an electrical energy source, and a thermal energy source.

5. The method according to claim 1, further comprising selecting the pulse of energy from the group consisting of an electrical pulse, a spark, a hot filament, and a laser beam.

6. The method according to claim 1, wherein positioning the exothermic reactive material and the braze alloy layer between the opposite second end of the base of the PDC cutting element and the substrate extension comprises:
   locating a first braze alloy foil adjacent to the opposite second end of the base of the PDC cutting element;
   locating a second braze alloy foil adjacent to the substrate extension; and
   locating the reactive material between the first braze alloy foil and the second braze alloy foil.

7. The method according to claim 1, wherein positioning the exothermic reactive material and the braze alloy layer between the opposite second end of the base of the PDC cutting element and the substrate extension comprises:
   coating a portion of the opposite second end of the base of the PDC cutting element and a portion of the substrate extension with a braze alloy; and
   inserting a foil of the reactive material between the portion of the opposite second end of the base of the PDC cutting element and the portion of the substrate extension.

8. The method according to claim 1, further comprising heating the PDC cutting element and the substrate extension prior to delivering the pulse of energy to the reactive material, igniting the reactive material, and causing the braze alloy layer to melt to join the base of the PDC cutting element to the substrate extension.

9. A method of joining components of a drill bit cutting element for drilling boreholes in earth formations, comprising:
   providing a polycrystalline diamond compact (PDC) cutting element having a base and a PDC cutter attached to the base, and a separate substrate extension;
   placing a first braze alloy on the base of the PDC cutting element on a side thereof opposite the PDC cutter and a second braze alloy on the substrate extension, and positioning an exothermic reactive material between the first braze alloy and the second braze alloy;
   applying pressure to force the PDC cutting element and the substrate extension together with the first braze alloy, the second braze alloy, and the reactive material therebetween; and
   delivering a pulse of energy to the reactive material, igniting the reactive material, and flowing the first braze alloy and the second braze alloy to join the base of the PDC cutting element to the substrate extension in less than one second.

10. The method according to claim 9, wherein the first braze alloy and the second braze alloy comprise an alloy material selected from the group consisting of Ag, Cu, Al, Ni, Au, Zn, Sn, and Ti.

11. The method according to claim 9, further comprising:
    applying the pulse of energy with one of an optical energy source, an electrical energy source, and a thermal energy source; and
    selecting the pulse of energy from the group consisting of an electrical pulse, a spark, a hot filament, and a laser beam.

12. The method according to claim 9, wherein placing the first braze alloy on the base of the PDC cutting element on the side thereof opposite the PDC cutter and the second braze alloy on the substrate extension comprises:
    coating the side of the base of the PDC cutting element with the first braze alloy; and
    coating the substrate extension with the second braze alloy.

13. The method according to claim 9, further comprising heating the PDC cutting element and the substrate extension prior to delivering the pulse of energy to the reactive material, igniting the reactive material, and flowing the first braze alloy and the second braze alloy to join the base of the PDC cutting element to the substrate extension.

14. A method of joining a cutting element to a fixed cutter bit for drilling boreholes in earth formations, comprising:
    providing a bit body having a fixed blade with a pocket formed therein;
    positioning an exothermic reactive material in the pocket;
    placing a polycrystalline diamond compact (PDC) cutting element in the pocket such that the reactive material is located between the fixed blade and the PDC cutting element;
    providing a reflowable braze alloy between the fixed blade and the PDC cutting element;
    delivering a pulse of energy to the reactive material, igniting the reactive material, and reflowing the reflowable braze alloy to join the PDC cutting element to the fixed blade;
    providing the PDC cutting element with a base and a PDC cutter on the base;
    positioning another exothermic reactive material on at least one of the base and a separate substrate extension;
    providing another reflowable braze alloy between the at least one of the base and the separate substrate extension;
    placing the PDC cutting element against the substrate extension such that the another exothermic reactive material and the another reflowable braze alloy are located between the base of the PDC cutting element and the separate substrate extension;
    placing the PDC cutting element and the substrate extension in the pocket; and delivering another pulse of energy to the another exothermic reactive material, igniting the another exothermic reactive material, and flowing the another reflowable braze alloy to join the PDC cutting element to the substrate extension while simultaneously delivering the pulse of energy to the reactive material, igniting the reactive material, and reflowing the reflowable braze alloy to join the PDC cutting element to the fixed blade.

15. The method according to claim 14, further comprising heating the PDC cutting element and the pocket prior to delivering the pulse of energy to the reactive material, igniting the reactive material, and reflowing the reflowable braze alloy to join the PDC cutting element to the fixed blade.

16. The method according to claim 14, further comprising selecting the reflowable braze alloy to comprise an alloy material selected from the group consisting of Ag, Cu, Al, Ni, Au, Zn, Sn, and Ti.

17. The method according to claim 14, further comprising:
applying the pulse of energy with one of an optical energy source, an electrical energy source, and a thermal energy source; and
selecting the pulse of energy from the group consisting of an electrical pulse, a spark, a hot filament, and a laser beam.

18. The method according to claim 14, wherein providing the reflowable braze alloy between the fixed blade and the PDC cutting element comprises:
locating a first braze alloy foil adjacent to the PDC cutting element; and
locating a second braze alloy foil adjacent to the pocket; and
wherein the method further comprises locating the exothermic reactive material between the first braze alloy foil and the second braze alloy foil.

19. The method according to claim 14, wherein providing the reflowable braze alloy between the fixed blade and the PDC cutting element comprises coating a portion of the PDC cutting element and a portion of the pocket with the reflowable braze alloy before positioning the exothermic reactive material in the pocket.

* * * * *